US011741696B2

(12) United States Patent
Julian et al.

(10) Patent No.: US 11,741,696 B2
(45) Date of Patent: *Aug. 29, 2023

(54) ADVANCED PATH PREDICTION

(71) Applicant: NETRADYNE, INC., San Diego, CA (US)

(72) Inventors: David Jonathan Julian, San Diego, CA (US); Avneesh Agrawal, Bengaluru (IN); Venkata Sreekanta Reddy Annapureddy, San Diego, CA (US)

(73) Assignee: NETRADYNE, INC., San Diego, CA (US)

( * ) Notice: Subject to any disclaimer, the term of this patent is extended or adjusted under 35 U.S.C. 154(b) by 521 days.

This patent is subject to a terminal disclaimer.

(21) Appl. No.: 17/023,305

(22) Filed: Sep. 16, 2020

(65) Prior Publication Data

US 2020/0409389 A1 Dec. 31, 2020

Related U.S. Application Data

(63) Continuation of application No. 16/138,059, filed on Sep. 21, 2018, now Pat. No. 10,871,783, which is a
(Continued)

(51) Int. Cl.
*G05D 1/02* (2020.01)
*G06V 10/82* (2022.01)
(Continued)

(52) U.S. Cl.
CPC ........... *G06V 10/82* (2022.01); *G05D 1/0246* (2013.01); *G05D 1/0274* (2013.01);
(Continued)

(58) Field of Classification Search
CPC .. G05D 1/0246; G05D 1/0274; G05D 1/0278; G05D 2201/0213; G06V 10/82; G06V 10/25; G06V 10/764; G06V 20/56; G06F 18/2413; G06N 20/00; G06T 7/246; G06T 7/74; G06T 2207/10016;
(Continued)

(56) References Cited

U.S. PATENT DOCUMENTS

2009/0140887 A1 6/2009 Breed et al.
2009/0319113 A1 12/2009 Lee
(Continued)

FOREIGN PATENT DOCUMENTS

WO WO 2014065485 A1 5/2014

OTHER PUBLICATIONS

Communication Pursuant to Article 94(3) EPC in EP Patent Application No. 17771141.3 dated Feb. 25, 2022, 5 pages.
(Continued)

*Primary Examiner* — Nadeem Odeh
(74) *Attorney, Agent, or Firm* — Michael Campos

(57) ABSTRACT

The present disclosure provides systems and methods for mapping a determined path of travel. The path of travel may be mapped to a camera view of a camera affixed to a vehicle. In some embodiments, the path of travel may be mapped to another view that is based on a camera, such as a bird's eye view anchored to the camera's position at a given time. These systems and methods may determine the path of travel by incorporating data from later points in time.

22 Claims, 5 Drawing Sheets

Related U.S. Application Data continuation of application No. PCT/US2017/023781, filed on Mar. 23, 2017.

(60) Provisional application No. 62/312,445, filed on Mar. 23, 2016.

(51) Int. Cl.

| | | |
|---|---|---|
| *G06T 7/246* | (2017.01) | |
| *G06V 10/25* | (2022.01) | |
| *G06V 20/56* | (2022.01) | |
| *G06F 18/2413* | (2023.01) | |
| *G06V 10/764* | (2022.01) | |
| *G06T 7/73* | (2017.01) | |
| *G06N 20/00* | (2019.01) | |

(52) U.S. Cl.
CPC ......... *G06F 18/2413* (2023.01); *G06N 20/00* (2019.01); *G06T 7/246* (2017.01); *G06T 7/74* (2017.01); *G06V 10/25* (2022.01); *G06V 10/764* (2022.01); *G06V 20/56* (2022.01); *G05D 1/0278* (2013.01); *G05D 2201/0213* (2013.01); *G06T 2207/10016* (2013.01); *G06T 2207/20081* (2013.01); *G06T 2207/20084* (2013.01); *G06T 2207/30252* (2013.01)

(58) Field of Classification Search
CPC . G06T 2207/20081; G06T 2207/20084; G06T 2207/30252
See application file for complete search history.

(56) References Cited

U.S. PATENT DOCUMENTS

| | | |
|---|---|---|
| 2010/0017115 A1 | 1/2010 | Gautama |
| 2010/0104199 A1 | 4/2010 | Zhang et al. |
| 2011/0170744 A1 | 7/2011 | Malinovskiy et al. |
| 2012/0062743 A1 | 3/2012 | Lynam et al. |
| 2013/0222589 A1 | 8/2013 | Lalonde et al. |
| 2014/0028878 A1 | 1/2014 | Basavaraja et al. |
| 2014/0098060 A1 | 4/2014 | McQuade et al. |
| 2014/0136046 A1 | 5/2014 | Smith et al. |
| 2015/0049193 A1 | 2/2015 | Gupta et al. |
| 2015/0355336 A1 | 12/2015 | Krulwich |
| 2017/0263014 A1 | 9/2017 | Kuznetsov et al. |

OTHER PUBLICATIONS

Kastrinaki, et al., "A survey of video processing techniques for traffic applications," Image and Vision Computing, Apr. 1, 2003, vol. 21, No. 4, pp. 359-381.

Chu, et al., Accurate Vision-Based Vehicle Localization using Satellite Imagery, Oct. 30, 2015, URL: https://arxiv.org/abs/1510.09171.

Extended European Search Report in EP Patent Application No. 177771141.3 dated Oct. 24, 20219.

Huang, et al., "Deep Learning Driven Visual Path Prediction From a Single Image," IEEE Transactions on Image Processing, Dec. 2016, vol. 25, Issue 12, pp. 5892-5904.

Houenou, et al., "Vehicle Trajectory Prediction Based on Motion Model and Maneuver Recognition," 2013 IEEE/RSJ International Conference on Intelligent Robots and Systems, Nov. 3, 2013, pp. 4363-4369.

International Search Report and Written Opinion in International Patent Application No. PCT/US2017/023781 dated Jun. 5, 2017, 4 pages.

Jain, et al., "Brain4Cars: Car That Knows Before You Do via Sensory-Fusion Deep Learning Architecture," URL: https://arxiv.org/abs/1601.00740.

Mogelmose, et al., "Trajectory Analysis and Prediction for Improved Pedestrian Safety: Integrated Framework and Evaluations," 2015 IEEE Intelligent Vehicles Symposium (IV), Jun. 28, 2015, pp. 330-335.

Walker, et al., "Patch to the Future: Unsupervised Visual Prediction," Proceedings of the IEEE Conference on Computer Vision and Pattern Recognition (CVPR), Jun. 23, 2014, pp. 3302-3309.

ADVANCED PATH PREDICTION

CROSS-REFERENCE TO RELATED APPLICATION

This application is a continuation of U.S. patent application Ser. No. 16/138,059 filed on the 21 Sep. 2018, and entitled "ADVANCED PATH PREDICTION," which is a continuation of and claims priority to PCT/US2017/23781, filed on the 23 Mar. 2017, and titled "ADVANCED PATH PREDICTION", which claims the benefit of U.S. Provisional Patent Application No. 62/312,445, filed on the 23 Mar. 2016, and titled, "METHODS FOR PREDICTING AND/OR TRAINING RESPONSES", the disclosures of which are expressly incorporated by reference in their entireties.

BACKGROUND

Field

Certain aspects of the present disclosure generally relate to intelligent driving monitoring systems (IDMS), driver monitoring systems, advanced driver assistance systems (ADAS), and autonomous driving systems, and more particularly to systems and methods for mapping a determined path of travel to a reference frame that is based on a camera position.

Background

Driving a moveable object, such as a vehicle or a robot, depends on understanding the "rules of the road", many of which are unwritten. An operator of a moving car, for example, may need to manage the proximity of other cars and objects, sometimes according to right-of-way rules, and sometimes according to generally accepted driving behaviors. For example, it may be desirable for a driver of a moving vehicle to maintain a safe distance between his vehicle and other moving vehicle. Likewise, it may be desirable to avoid slow-moving or stationary objects.

For many driving situations, successful driving may depend on predicting a path of travel. For example, if a driver notices an object on a road, an appropriate response may be to change lanes. In another example, if a driver notices a slow-moving car, he may respond differently depending on whether the slow-moving car is currently in the driver's lane. If so, he may need to slow down or modify his path of travel.

Reliable path prediction may benefit a number of driving related devices, including ADAS and IDMS devices. For example, a path prediction system may aid an IDMS in determining an extent to which a driving behavior is safe or unsafe. While much effort has been expended in path prediction systems and methods, the complexity and variability of real-world driving situations continue to make path prediction challenging.

Accordingly, aspects of the present disclosure are directed to improved systems and methods for path of travel prediction. Aspects of the present disclosure may be directed to improving systems and methods that may depend on path of travel prediction, such as IDMS, driver monitoring, ADAS, and autonomous driving systems, among others.

SUMMARY OF THE INVENTION

The present disclosure provides systems and methods for mapping a determined path of travel. In some embodiments, the path of travel may be mapped to a camera view. In some embodiments, the path of travel may be determined in response to other objects. Certain path prediction systems and methods improve upon the prior art by incorporating information from later points in time. In addition, systems and methods for detecting an object are provided that may process an image or video frame faster and/or at higher resolution in comparison to current methods. In addition, methods are presented for detecting and/or recognizing an object in a video or in a Lidar and/or radar data frame. In some embodiments, and object may be detected and/or recognized based on the appearance of the object in a later data frame.

Certain aspects of the present disclosure provide a method of mapping a determined path of travel. The method generally includes determining a path of travel of a vehicle from a first time to a second time, wherein the second time is later than the first time; and mapping the determined path of travel to a first reference frame, wherein the first reference frame is based on a position of a camera at the first time.

Certain aspects of the present disclosure provide an apparatus configured to map a determined path of travel. The apparatus generally includes a memory unit; and at least one processor coupled to the memory unit, in which the at least one processor is configured to: determine a path of travel of a vehicle from a first time to a second time, wherein the second time is later than the first time; and map the determined path of travel to a first reference frame, wherein the first reference frame is based on a position of a camera at the first time, and wherein the camera is attached to the vehicle.

Certain aspects of the present disclosure provide an apparatus configured to map a determined path of travel. The apparatus generally includes means for determining a path of travel of a vehicle from a first time to a second time, wherein the second time is later than the first time; and means for mapping the determined path of travel to a first reference frame, wherein the first reference frame is based on a position of a camera at the first time, and wherein the camera is attached to the vehicle.

Certain aspects of the present disclosure provide a non-transitory computer-readable medium having program code recorded thereon for mapping a determined path. The program code is executed by a processor and generally comprises program code to determine a path of travel of a vehicle from a first time to a second time, wherein the second time is later than the first time; and map the determined path of travel to a first reference frame, wherein the first reference frame is based on a position of a camera at the first time, and wherein the camera is attached to the vehicle.

DETAILED DESCRIPTION

Figure 1:
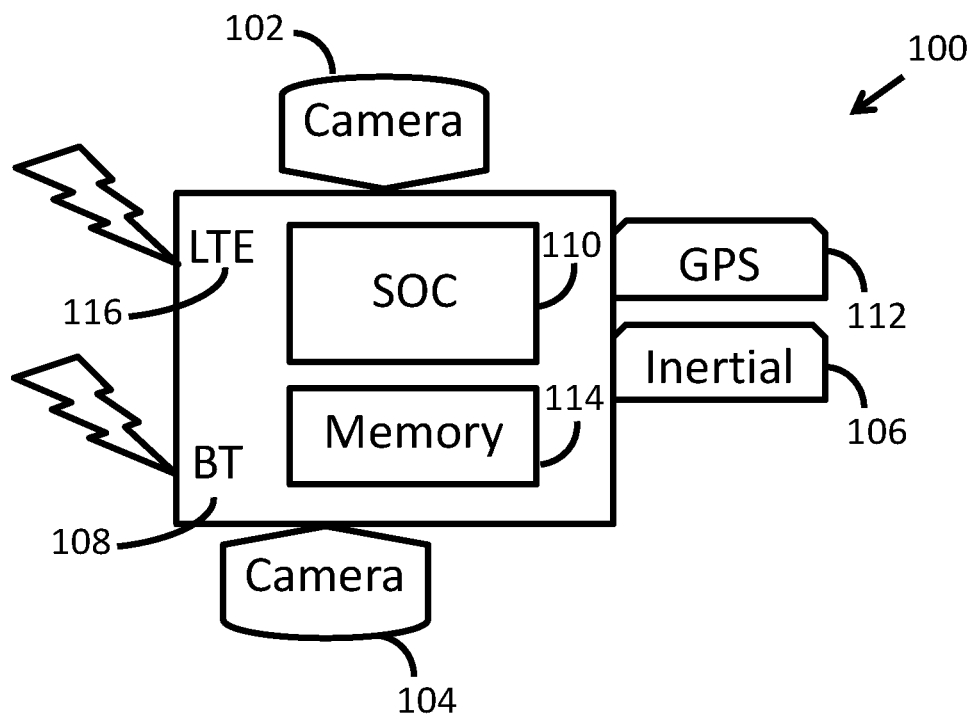
FIG. 1 illustrates an example of a device configured to map a determined path of travel in accordance with certain aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

It must be noted that as used herein and in the appended claims, the singular forms "a", "an", and "the" include plural referents unless the context clearly dictates otherwise. Thus, for example, reference to "an object" includes a plurality of objects.

Path Prediction Challenges

Systems and methods for path prediction may rely on lane detection. If lane boundaries are detected, a path of travel may be inferred based on the detected lane boundaries. Such a system, for example, may predict a path of travel that maintains a currently observed distance to a detected lane boundary.

Current methods for determining a path of travel from a given point in time may include recording an image or video frame and using a computer vision (CV) based lane detection. CV based lane detection may include edge detection followed by curve fitting, such as with a Hough Transform or RANSAC. While this approach may provide acceptable path of travel predictions in some situations, it may fail to provide acceptable path of travel predictions in situations in which lane detection itself may be challenging.

Challenging lane detection situations may include roads that are curved, roads that do not have clear lane markings, and dense traffic scenarios in which lane markings may be occluded by other cars. Examples of such challenging situations include side streets, parking lots, freshly paved roads, as well as snow and rain covered roads. Additionally, even when markings are present, the detection of markings may be difficult or confusing, such as in intersections and turn bays, places where old markings partially or fully remain, or in heavy traffic where other cars may occlude the lane markings. Lastly, roads may be curvy, making it unclear if an object ahead of a car is in the same lane or in a nearby lane, and therefore whether a driver should adjust her path of travel. For current systems, therefore, path prediction remains a challenging problem. While path prediction methods may operate satisfactorily in some situations, such as on un-crowded highways where lane markings are clear and present, they may fail to operate in other situations. For example, current path prediction systems may fail to operate when lane markings are unclear or not present.

Certain aspects of the present disclosure are directed to determining the path of travel in a way that may be robust to situations in which lane markings are not clearly visible, are occluded, and the like, as described below.

Some current methods of path prediction may rely on a machine learning model that has been trained to predict driving actions based on sensor measurements. In some cases, a model may have access to up-to-the-moment data, such as a recently captured video frame data, and may additionally have access to a history or sensor data. Based on sensor data, a machine learning model may compute a prediction of a future path of travel.

As with methods based on lane detection, path prediction based on machine learning may be confronted with many challenges that may hinder its utility. For example, machine learning methods may require large amounts of labeled training data. For path prediction, obtaining labels for safe and/or appropriate paths of travel for a given situation may be cumbersome or expensive. In addition, the dynamics and variability of real-world driving scenarios may limit the time horizon to which a path may be predicted within a desired accuracy.

Certain aspects of the present disclosure are directed to determining the path of travel in a way that may be used to facilitate the collection of a desired amount of labeled training data, as described below.

Desired Latency for Path of Travel Systems in IDMS

An IDMS may monitor aspects of the driver's driving behavior, which may refer to driving actions. An IDMS may, for example, make determinations about whether certain driving maneuvers are appropriate in a given situation. An IDMS may also include a "driver" monitoring system that may monitor physiological signals (such as pupil diameter) of a driver. An IDMS may be applied to drivers of vehicles, such as cars, boats, and airplanes, as well as to factory robots, humanoid robots, and the like. Furthermore, an IDMS may be applied to moving objects being driven by a human driver or by an algorithmic controller. In some applications, an IDMS may determine a grade for a driver's performance or for the performance of an algorithmic controller.

A time between an occurrence of an event and a time that a system reports the occurrence of the event may be referred to as a latency. A latency of less than one second may be referred to as a real-time latency, or a system that is configured for real-time performance. Near-real time performance may correspond to a system that may make determinations at a rate that is slower than real-time, but that may still affect the driver's driving. In some cases, near real-time performance may correspond to a latency between 1 second to 1 minute.

A desired latency for an autonomous driving system may be less than one second. Real-time performance for an autonomous driving system may correspond to a system that may make determinations about the environment within a time window that is short enough that the driver (or controller) may incorporate the determination in his (or its) response to the environment. Likewise, such ADAS or autonomous driving systems may be said to operate "in-the-loop." "In-the-loop" may mean that the ADAS operates within a typical sensory-to-motor response loop of a driver. For example, an ADAS may sense that another car is entering the lane of the driver and may alert the driver in less than one second, as described above. As another example, an ADAS may alert the driver that a lane change would be unsafe at the current time.

Accordingly, an autonomous driving system may be expected to continuously or periodically respond to the surrounding environment. As such, methods have been developed in support of ADAS or autonomous driving systems that may produce alerts or driving actions based on information that is available at the current time.

In some IDMS applications, a user's latency tolerance may be more than one minute. Some IDMS, for example, may be configured so that they do not communicate the results of the monitoring in real-time or near real-time. In some embodiments, an IDMS may not communicate the results of the monitoring to the driver at all. Rather, the IDMS may communicate a driving behavior inference to a third-party, such a fleet safety manager, who may have a latency tolerance of several minutes. In these situations, and others, an IDMS may not need to meet a real-time or near real-time reporting latency.

An IDMS may also operate in real-time or near-real-time. In one example, a near real-time system may make determinations about a driving state while the driver is still in the determined state. A combined ADAS and IDMS system running in near real-time, for example, may notify a driver that his driving behavior is indicative of distracted driving. In some cases, near real-time performance may correspond to detecting a behavioral state of a driver within 5 seconds to 1 minute of its onset.

Certain aspects of the present disclosure may be applied to an Intelligent Driver Monitoring System (IDMS), combined ADAS and IDMS systems, and the like. In addition, certain real-time systems may be enabled according to certain aspects of the present disclosure.

"Back-to-the-Future" Path of Travel Determination

Certain aspects of the present disclosure may exploit a reduced latency tolerance of an IDMS. Certain aspects may also be applied to low-latency systems, such as ADAS and autonomous driving systems. Since an IDMS is not necessarily "in-the-loop", an analysis of a driving situation at a given time need not be limited to information that is available at that time. Rather, certain aspects of the present disclosure are directed to methods that improve the analysis of a driving situation at a given time by incorporating information from the "future". Certain aspects may be applied instead of, or in addition to, using CV approaches to determine a path of travel based on a "presently" received video frame. According to certain aspects, "future" frames and/or sensor data may be used to determine the "future" path of travel from the vantage point of the "presently" received video frame. Since a determination regarding a driving situation at a given time may be performed at a later time, the "future" information relative to that given time may have already occurred. This approach may be called a "Back-to-the-Future" approach.

FIG. 1 illustrates an embodiment of the aforementioned systems and methods for mapping a determined path of travel. The device 100 may include input sensors (which may include a forward facing camera 102, a driver facing camera 104, connections to other cameras that are not physically mounted to the device, inertial sensors 106, car OBD-II port sensor and vehicle data (which may be obtained through a Bluetooth connection 108), Lidar, radar, and the like) and compute capability 110. The compute capability may be a CPU or an integrated System-on-a-chip (SOC), which may include a CPU and other specialized compute cores, such as a graphics processor (GPU), gesture recognition processor, and the like. In some embodiments, a system or method for mapping a determined path of travel may include wireless communication to cloud services, such as with Long Term Evolution (LTE) 116 or Bluetooth 108 communication to other devices nearby. In addition, LTE 116 or Bluetooth 108 communication may be used to gather data from disaggregated sensors, which, in some embodiments may include Lidar, radar, and the like. The device may also include a global positioning system (GPS) either as a separate module 112, or integrated within a System-on-a-chip 110. In some embodiments, a disaggregated sensor, such as Lidar, radar, or GPS may communicate directly to the device 100, may communicate to the device via an intermediary processing unit, may communicate to the device via a cloud server, may communicate to a cloud server for further processing, possibly in combination with data communicated to the cloud from the device 100. For example, the cloud may provide real-time analytics assistance. In an embodiment involving cloud services, the cloud may facilitate aggregation and processing of data for offline analytics or for training of machine learning models. The device may further include memory storage 114.

An exemplary embodiment may comprise a camera 102 mounted in a vehicle's windshield and a means for determining the path of travel, which may be based on camera 102 input. In some embodiments, the path of travel may be determined based on visual odometry that is based on the camera input, or based on visual inertial odometry (VIO) that is based at least in part on camera and inertial sensor input. The path of travel may be determined by other means, such as via crowd-sourcing of likely paths based on previously recorded data, as described below, and/or using non-visual sensors such as GPS. The system may then map the determined future path of travel to the perspective of the camera view at time t0, or any other recorded camera view, or in some embodiments, a predicted camera view at another time. For example, the determined path of travel may be mapped to a camera view collected from another car, a camera view of a stationary camera, or a camera view based on a 3D map of the environment.

Another exemplary embodiment may comprise a means for determining a path or travel, which may include determining a path for travel from sensors, such as a camera 102 mounted in a car's windshield, a GPS receiver 112, inertial sensors 106, and other sensors. Alternatively, the means for determining a path of travel may include communicating data about the current state of the car to a cloud server and receiving a typical path of travel based on the communicated data. In an embodiment involving a vehicle, the system may determine the following distance in seconds to the closest car, if any, along the future path of travel based on the vehicle's velocity at a time t0. In this example, the system may be running in near-real time (e.g. at a 5 second latency), such that the time t0 is 5 seconds in the past. The system may process the video frame at time t0. The processing may include detecting bounding boxes for cars in that video frame. The system may then determine the future path of travel for the next 5 seconds after t0. That is, the system may then determine the future path of travel from the perspective of the frame at t0 that includes the path of travel up to the second time. The second time may correspond to the time that the most recent sensor data were recorded (such as the most recent GPS reading) in the time between t0 and the end of the 5 second latency. From the perspective of t0, the path of travel from t0 to the second time may be considered a "future" path of travel. Several means for determining the future path of travel are contemplated. The future path of travel may be based, at least in part, on GPS data, future data frames, which may include video frames, GPS readings, Lidar and/or radar scans, (frames that were captured between time t0 and the present time), and/or continuously or periodically collected data from inertial sensors and the like.

A system enabled with certain aspects of the present disclosure may then perform a mapping that may overlay the future path of travel on the image that was collected at time t0. In some embodiments, the system may determine the closest car that impacts the determined path of travel, determine the distance to that car, and may convert that distance to time based on the ego-car's current velocity (the velocity of the car in which the system is mounted). In another exemplary embodiment, the distance to another car may be determined based on Lidar and/or radar sensory systems. In one embodiment, the Lidar and/or radar may augment camera-based image processing. Alternatively, the Lidar and/or radar may replace camera-based image processing.

In addition to mapping the path of travel to a camera view, the path of travel may also be mapped to a different reference frame that may be anchored to a camera position, such as an overhead view that is aligned with a camera that is mounted in the moving vehicle.

Figure 2:
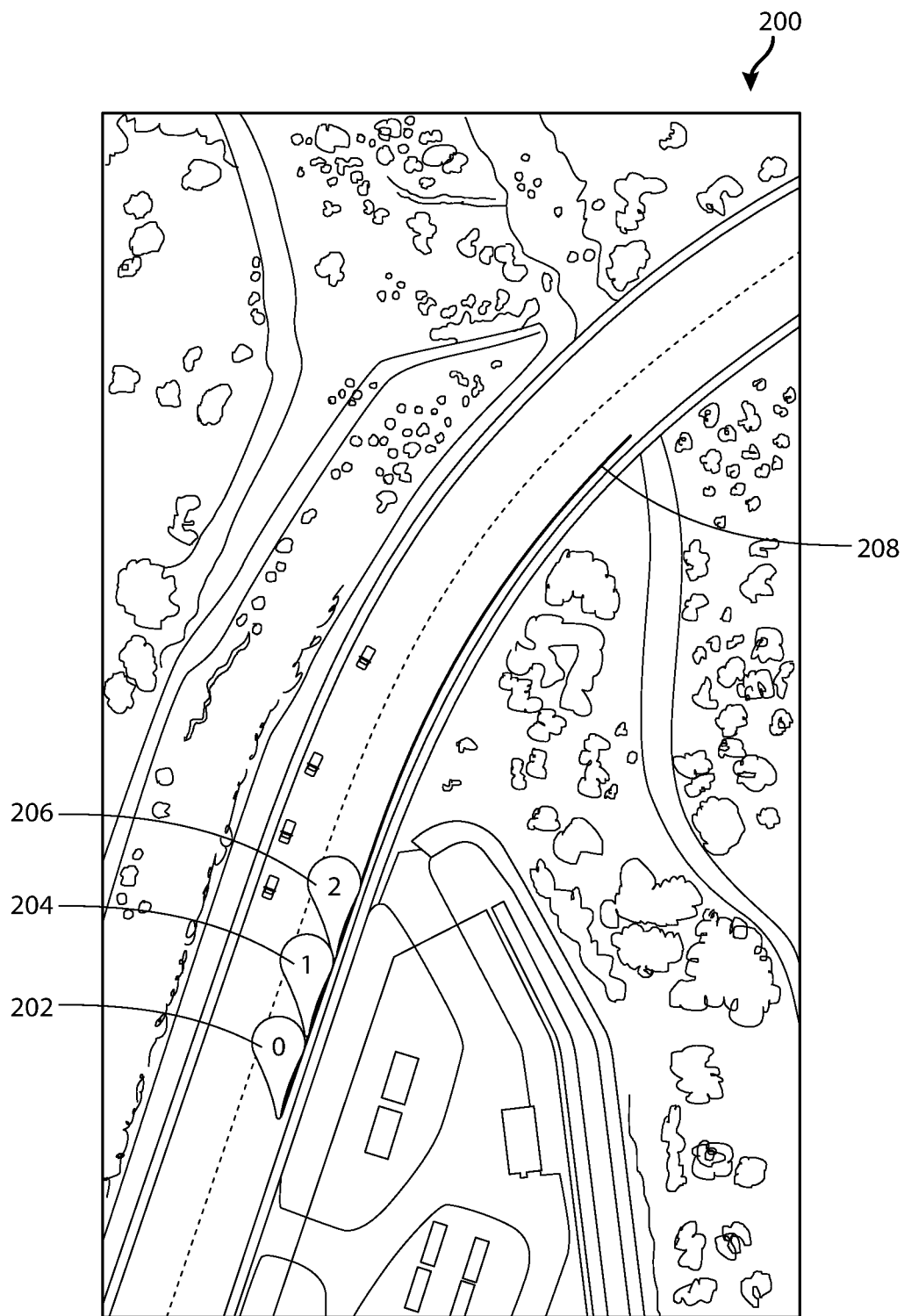
FIG. 2 illustrates an example of a method for mapping a determined path of travel in accordance with certain aspects of the present disclosure.

FIG. 2 illustrates an example of mapping a path of travel in accordance with certain aspects of the present disclosure. The vehicle for which the path is determined may be referred to as the ego-car. A satellite image 200 depicts a portion of a curved road. The pin marker 202 indicates the location of an ego-car at a first time, time t0. The pin marker 204 indicates the location of the ego-car at time t1 (t0+1 second). The pin marker 206 indicates the location of the ego-car at time t2 (t0+2 seconds). The pin marker 202 may be referred to as the "current" position in accordance with certain aspects of the present disclosure. The line 208 indicates the path of travel of the ego car from the first time, time t0, to a second time which may be several seconds later.

Figure 3A:
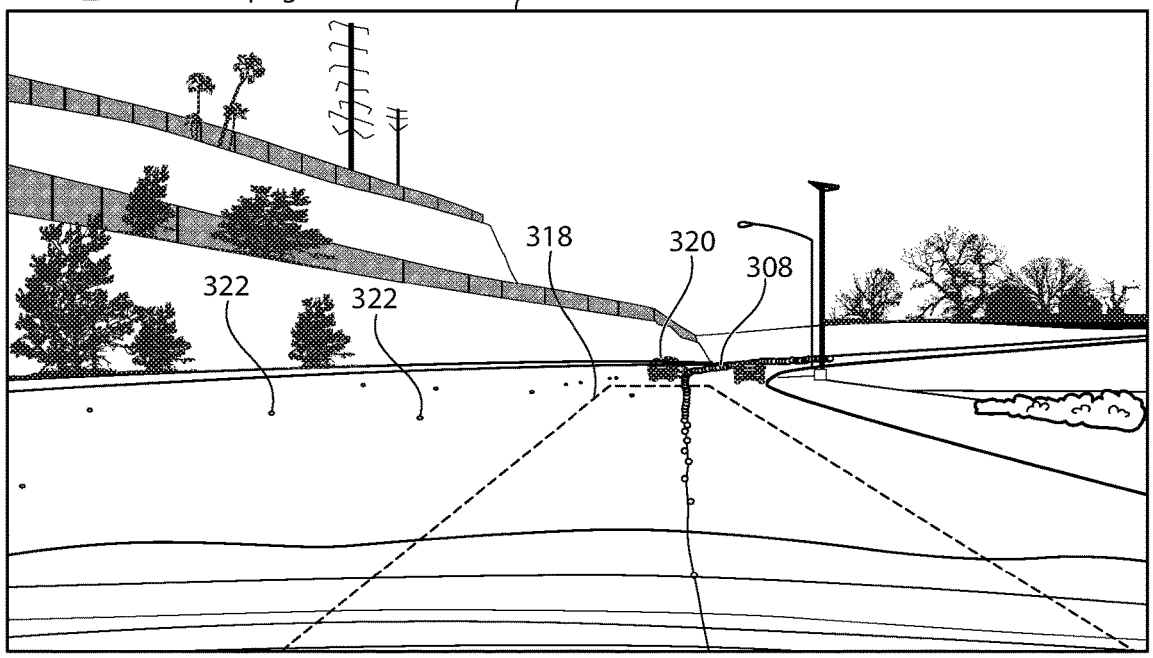
FIG. 3A illustrates an example of a method for mapping a determined path of travel in accordance with certain aspects of the present disclosure.

In FIG. 3A, a mapping of the future path of travel 308 (corresponding to the path of travel 208 illustrated in FIG. 2) is overlaid on the "current" frame 302. The "current" frame 302 corresponds to the position 202 of the camera within the ego-car at time t0. The mapping comprises a projection of the GPS path 304, illustrated in FIG. 3C, from a horizontal plane 306 to an overhead (bird's-eye-view) reference frame 310 illustrated in FIG. 3B, and then to the camera view 302 illustrated in FIG. 3A. The bird's eye view reference frame 310 is anchored to the camera position at the bottom. The future path of travel 308, illustrated in FIG. 3B may be projected into the "current" frame 302 with an inverse perspective mapping.

FIG. 3A further illustrates that a system may include timestamps 312 for the current video frame 302 and timestamps for the current GPS reading 314. The system may also include an internal state representation, which may include a current speed 316. The current image may also include an overlay 318 on the portion of the road directly in front of the ego-car that may correspond to a typical lane-width.

The illustrations of an exemplary system in FIGS. 2 and 3A-C demonstrate the utility of certain disclosed systems and methods in a driving situation characterized by a curved road with multiple lanes but without typical lane markings. In this example, the road had been recently paved and the lane markings had yet to be painted at the time that this video frame was captured. Instead, the road has a number of temporary lane markings, 322. In this image, 302, a first car 320 appears to be directly in front of the ego-car. The mapping of the determined path of travel 308, however, indicates that the first car 320 is not in the same lane as the ego-car, despite its position directly in front of the ego-car. Instead, the determined future path of travel 308 moves rightward before it comes into contact with the first car 320, indicating that the first car 320 is in an unmarked lane to the left of the ego-car. The spacing between the future path of travel of the ego-car 308 and the current position of the first car 320 can also be seen in the overhead view illustrated in FIG. 3B.

Figure 4:
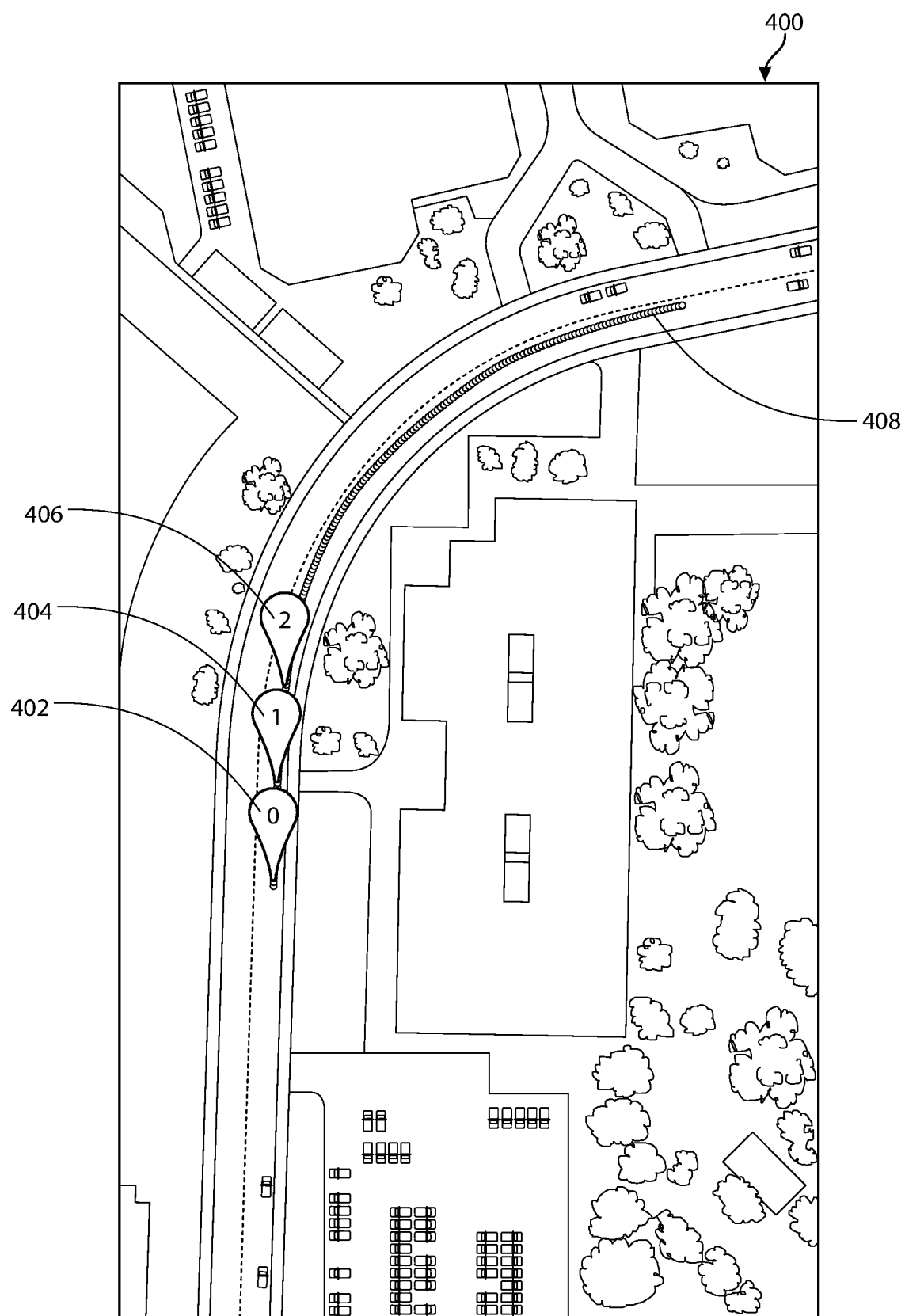
FIG. 4 illustrates an example of a method for mapping a determined path of travel in accordance with certain aspects of the present disclosure.

FIG. 4 illustrates an example of mapping a path of travel in accordance with certain aspects of the present disclosure. A satellite image 400 depicts a portion of a curved road. The pin marker 402 indicates the location of an ego-car at a first time, time t0. The pin marker 404 indicates the location of the ego-car at time t1 (t0+1 second). The pin marker 406 indicates the location of the ego-car at time t2 (t0+2 seconds). The pin marker 402 may be referred to as the "current" position in accordance with certain aspects of the present disclosure. The line 408 indicates the path of travel of the ego car from the first time, time t0, to a second time, which may be several seconds later.

Figure 5A:
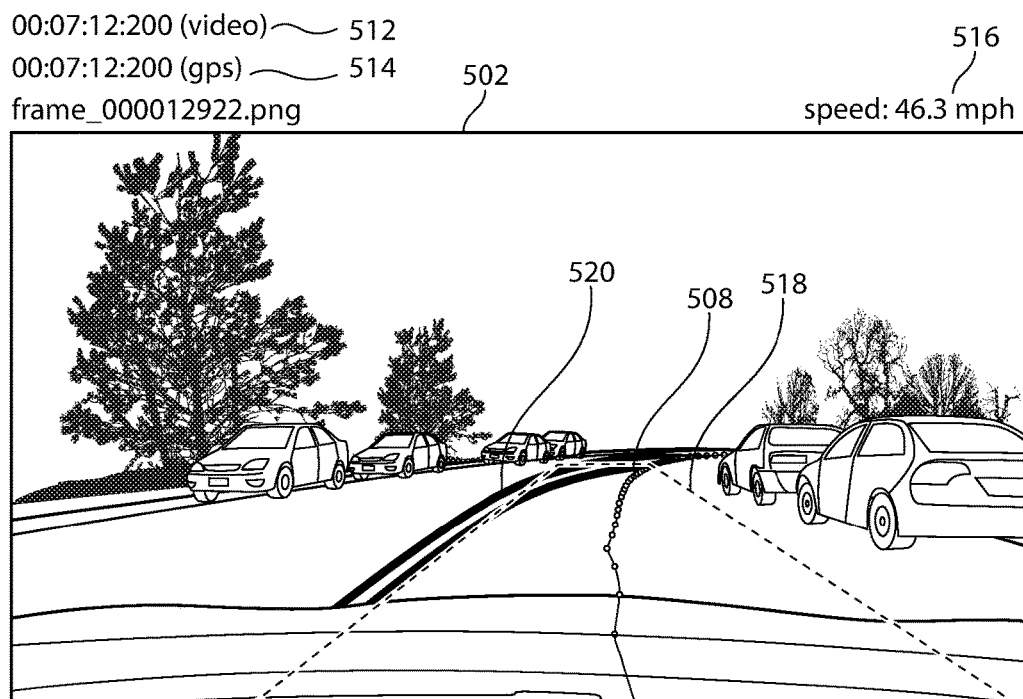
FIG. 5A illustrates an example of a method for mapping a determined path of travel in accordance with certain aspects of the present disclosure.

In FIG. 5A, a mapping of the future path of travel 508 (corresponding to the path of travel 408 illustrated in FIG. 4) is overlaid on the "current" frame 502. The "current" frame 502 corresponds to the position 402 of the camera within the ego-car at time t0. The mapping comprises a projection of the GPS path 504, illustrated in FIG. 5C, from a horizontal plane 506, to an overhead (bird's-eye-view) reference frame 510 illustrated in FIG. 5B, and then to the camera view 502. The bird's eye view reference frame 510 is anchored to the camera position at the bottom. The future path of travel 508, illustrated in FIG. 5B may be projected into the "current" frame 502 with an inverse perspective mapping.

FIG. 5A further illustrates that a system may include timestamps for the current video frame 512 and timestamps for the current GPS reading 514. The system may also include an internal state representation, which may include a current speed 516. The current image may also include an overlay 518 on the portion of the road directly in front of the ego-car that would correspond to a typical lane-width 518.

The illustrations of the exemplary system in FIGS. 4 and 5A-C demonstrate the utility of certain disclosed systems and methods in a driving situation characterized by a curved road with parked cars on one side. In this example, certain aspects of the disclosed methods help to differentiate between objects in the path of travel versus outside the path of travel. In the current frame 502, a central dividing lane marker 520 is clearly visible. However, there are no lane markings on the right side of the ego-car's lane. In this example, the rightmost boundary of the ego-car's lane may be inferred from the determined path of travel 508, which is at a safe distance from the lane of parked cars. The spacing between the future path of travel of the ego-car 508 and the row of parked cars can also be seen in the overhead view illustrated in FIG. 5B.

The "Back-to-the-Future" approach, which is described above for path prediction, may be used for other aspects of an IDMS as well. For example, the IDMS may measure certain driving metrics including following distance, tailgating, and pedestrian interactions, among others. Furthermore, an IDMS based on certain aspects of the present disclosure may predict that a vehicle will leave its lane of travel (possibly without signaling/unintentionally), may predict a lane change may predict a turn, may predict a collision with an object (car, pedestrian, animal, etc.), may predict a change in speed (such as an acceleration or stop), among others. In some embodiments, an enabled system may predict driver distraction.

Determining and Mapping a Path of Travel

Several means for determining the future path of travel are contemplated. These include using a GPS lat/long/altitude trace (e.g. a first and a second GPS measurement), using future frames with simultaneous localization and mapping (SLAM) or visual odometry, using accelerometer, gyro, and/or magnetometers to dead reckon the path, or using a combination of these approaches to improve robustness and accuracy of the future path. Additionally, the GPS location may be combined with map data to refine or validate the determined path. For example, the GPS locations may be repositioned to a valid road location based on map data to account for GPS inaccuracies. In addition, Lidar and/or radar data may be combined with Lidar and/or radar map data to refine or validate the determined path.

Figure 3B:
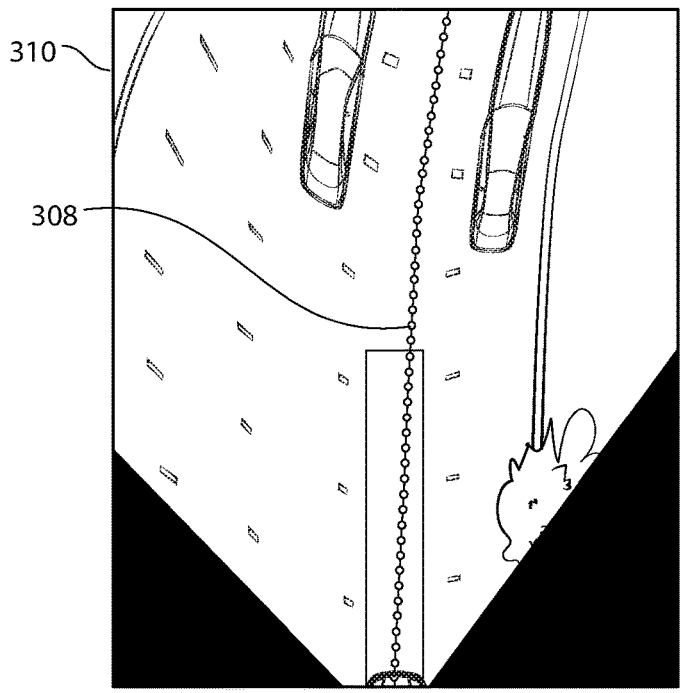
FIG. 3B illustrates an example of a method for mapping a determined path of travel in accordance with certain aspects of the present disclosure.
Figure 3C:
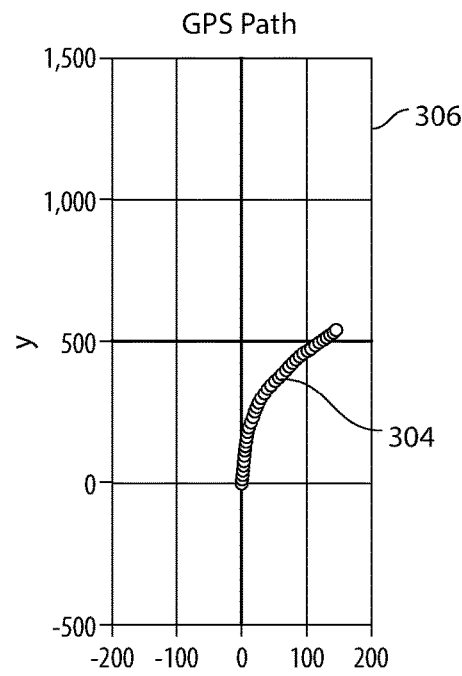
FIG. 3C illustrates an example of a method for mapping a determined path of travel in accordance with certain aspects of the present disclosure.
Figure 5B:
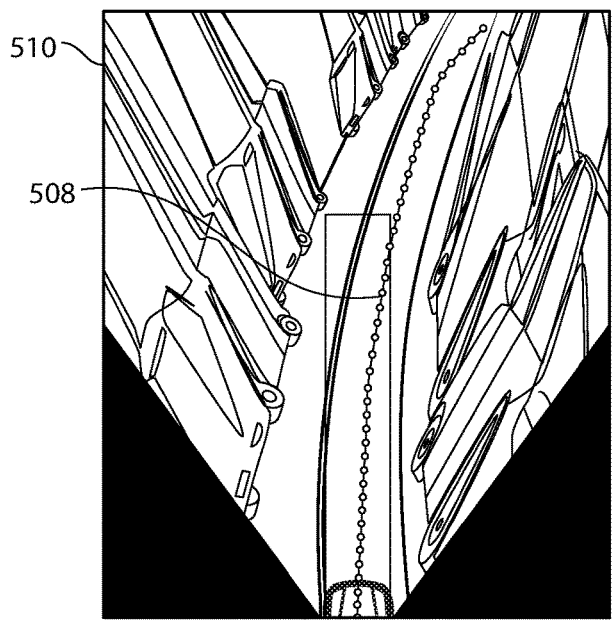
FIG. 5B illustrates an example of a method for mapping a determined path of travel in accordance with certain aspects of the present disclosure.
Figure 5C:
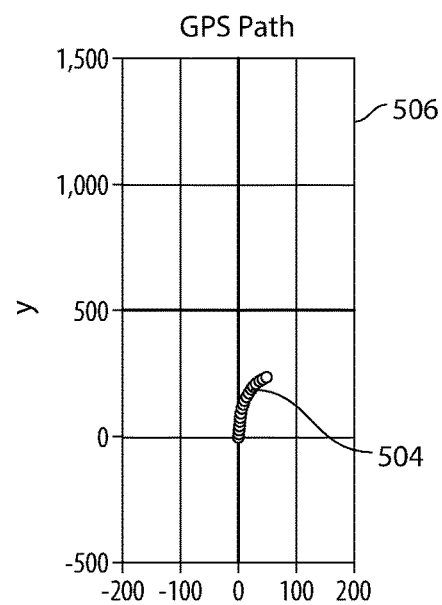
FIG. 5C illustrates an example of a method for mapping a determined path of travel in accordance with certain aspects of the present disclosure.

Once the future path is determined, the path and/or object locations may be mapped into a common setting, or reference frame, to determine interactions. In one embodiment, the future path may be mapped into a Bird's Eye View (BEV) corresponding to an Inverse Perspective Model (IPM) from the camera view to the BEV. Examples of this mapping are illustrated in FIG. 3B and FIG. 5B. After this mapping, a computed homography matrix may then be used to map the path from the IPM reference frame to the first camera view, which may be referred to as the camera view reference frame, at time t0. Once the determined future path is mapped into the camera view reference frame at time t0, the future path interactions with objects in the camera view may be calculated.

Alternatively, future path interactions may be calculated in the BEV reference frame. In an embodiment of certain aspects of the present disclosure, the camera view pixel locations may be mapped to a BEV reference frame using an IPM and applying the inverse homography matrix. The future path of travel may also be mapped into the BEV interactions between the future path of travel and objects that were mapped from the camera view may be calculated in the BEV reference frame.

In some embodiments, the homography matrix may be computed based on a camera calibration. In some embodiments, the homography matrix may be auto-calibrated, for example, by using a lane detection method to determine lane locations and vanishing points in a camera reference frame. In this example, a lane may be detected and a known lane width may be used to calibrate the homography matrix calculation. Similarly, the camera view may be mapped to IPM-view equivalency points, and a corresponding homography matrix may be computed from these mapped points. In addition, a homography matrix may be determined using inertial sensors (such as gyrometer, accelerometer, and barometer), Lidar and/or radar, or GPS to estimate the camera's orientation with respect to the ground plane.

The future path may be determined in a reference frame that is not tied to a camera view. For example, a GPS sensor may be used to determine a path of travel in world coordinates. In these embodiments, the future path may be oriented (e.g. rotated) so that it corresponds with a specified camera view. For example, if a camera is mounted in a car windshield so that it faces forward, a straight and forward path oriented to the camera view will be a vertical line in the center of the camera view. Several ways of orienting the future path are contemplated. In one embodiment, the direction of travel may be measured. A measurement of the direction of travel may be computed using GPS data, for example. In another embodiment, the direction of travel may be assumed to be forward, so that the instantaneous path of travel is straight and forward. In this example, the path tangent at time t0 may lie straight ahead.

When the path is straight and forward from the camera view, the path in the IPM-based reference frame may include a first and a second data point that may be mapped to the y-axis straight ahead of the camera, in which y is the up-down axis of the camera view. For a camera mounted to a car, changes in the y-direction of the future path that are not accompanied by changes in the x-direction may indicate a path of travel that is straight and forward.

In some embodiments, the data points may be curve fit, or interpolated, to determine a tangential path at time t0 for orienting the path. In addition, a magnetometer (such as a compass) may be accessed to determine the compass orientation of the vehicle at time t0. In this example, the reading from the magnetometer may be oriented to align the GPS track according to the magnetometer information. In this example, the orientation may be further refined based on a known or estimated magnetic deviation for the geographic lat/long location.

In some embodiments, GPS data may be used to compute the future path of travel. In one example, the lat/long values may be used to determine a 2D path. This approach may yield acceptable results if the road forms a ground plane. In another example, the altitude information may be used to enhance the determined future path of travel to include a 3D path that may account for inclines. In addition, inertial sensors may be used to refine an estimate of the angle of inclination.

Use of "Back-to-the-Future" Methods in Learning Systems

It may be desirable for a learning system to learn to predict future paths of travel. A challenge for learning systems, however, may be a requirement for labeled data. For example, labeled data may be a video frame for which a person has labeled boundaries of a visible lane and/or an appropriate future driving path given the video frame. In some cases, an appropriate future driving path may depend on a state of the vehicle, which may include a driving speed. In some cases there may be multiple appropriate paths of travel. Alternatively, or in addition to labeled data with respect to a video frame, labeled data may include a satellite image for which a person has labeled boundaries of a visible lane and/or an appropriate future driving path of travel. To effectively learn to predict paths of travel, a learning system may require an amount of labeled that would be burdensome or infeasible for a human labeler or a group of human labelers to produce.

Certain aspects of the present disclosure are directed to methods that may enable training a learning system on data for which some video frames may not contain human provided labels. In some cases, video frames with human provided labels may also be used. The application of these methods may enable a learning system so that it becomes capable of path of travel prediction. In addition, the application of certain disclosed methods may decrease overall training time compared to learning systems that rely only on human-labeled data. By utilizing the disclosed methods, a system may be created that is predictive of a path of travel.

In the "Back-to-the-Future" approach, a path "prediction" may be compared with an accurate prediction of the future, which may be achieved by actually looking into the future, as described above. When applied to predicting and training, the "Back-to-the-Future" approach may be used as a measured future against which to train a machine learning algorithm's predicted future. In this training example, the machine-learning algorithm may not have access to the future data during its prediction step. Rather, the future data would serve as a type of machine-labeled data set against which to compare the prediction. In this way, the future data may be used as "labels" which may largely replace or diminish a need for human labeling to indicate a likely path.

In an embodiment of the present disclosure, a "Back-to-the-Future" method may be used, such that a future path of travel starting at a given time may be determined. In this example, the need for human labeling or interaction may be significantly reduced or eliminated. A machine learning engine, which may include a deep learning engine, may be trained to predict the future path given a current frame. In some embodiments, the learning engine may also have the current and recent past inertial data and/or GPS data tracks as inputs, and/or the past series of frames. In addition, inputs to the learning engine may also include a current internal state estimate. An internal state estimate may include, for example, a current velocity, extrinsic or intrinsic camera parameters, and the like.

In this example, the data available to the deep learning engine may include data recorded up until a given point in time (which may be referred to as a first time), which may include an internal state estimate. The deep learning engine may generate a prediction based on these inputs. In some embodiments of the present disclosure, the deep learning engine may refine its parameters, or learn, based on the difference between this predicted path of travel and the subsequently determined future path of travel. The determined path of travel may be the path from the first time to a later second time.

In one embodiment, the input to a deep neural network may be a single frame, and the output may be a predicted path. The predicted path may be a direction-normalized path in an IPM-based reference frame. In another embodiment, the input may be a sequence of a number of past and current frames, and the output may be a predicted path. In some embodiments, the input may be a sequence of frames and the network architecture may include a feed-forward structure for which a group of frames taken from a window of time are presented together to the network as inputs. In an alternative embodiment, the input may be a group of frames that are presented sequentially to a neural network that has a recurrent neural network structure. In these examples, the output of the feed-forward or recurrent neural network may be a prediction of the future path of travel. Other embodiments of a path prediction engine in accordance with certain aspects of the present disclosure may utilize additional or alternative inputs from inertial sensors, on-board diagnostic (OBD) inputs such as speedometer, fuel flow, and additional sensors.

In one embodiment, at any given time t, an Artificial Intelligence (AI) engine may predict a path of travel, p, where p is a vector p(t), p(t+dt), p(t+2dt) (p+(N−1)dt). Over the next Ndt time instances, the system may measure the actual path of travel a, and then calculate the error |a−p|. The frame of reference may shift over time as the vehicle moves, but the determined actual path of travel, a, may be projected, or mapped, back in time to a_hat, which may correspond to the time t. Alternatively, p, may be mapped to a newer frame of reference as p_hat.

In this example, p and a may be functions of road conditions, vehicle type, vehicle speed, other inertial data, traffic situation, traffic signs, GPS readings, environment, region, lane markings, and the like.

For training, it may be assumed that most users of a system that incorporates certain aspects of the present disclosure are "good" drivers. By aggregating data from a diversity of users and in a variety of conditions, a learning system configured according to certain methods of the present disclosure may learn to accurately predict future paths of travel based on currently available data. Such a system may then be applied in ADAS or autonomous driving systems for which real-time or near-real time performance may be desired. For example, the system could issue a predicted path of travel as a target path for the control system of an autonomous car. Because a "Back-to-the-Future" approach may automatically produce a predicted path of travel that may closely approximate an actual path of travel, a, in an efficient manner, a learning system based on such data may learn to "drive" in types of driving conditions that remain challenging for current ADAS and autonomous driving systems by supplying the requisite amount of machine-labeled data.

A system that determines a future path of travel in accordance with certain aspects of the present disclosure may have many applications. For example, a system in accordance with certain aspects of the present disclosure may be employed in an AI engine of an IDMS, an ADAS, and autonomous driving, or a driver monitoring application. In an IDMS, for example, a desired latency may be less than that of an ADAS and autonomous driving system. As a consequence, the training of a predictive AI engine, which may be applied to an IDMS, driver monitoring system, ADAS, autonomous driving system, and others, need not occur in real-time or near real-time. Rather, the system could store the p and a vectors in a memory. In some embodiments, the stored p and a vectors may be accessed at a later time and presented to a learning system in a randomized fashion. A randomized presentation of inputs may result in an improved learning behavior. In some embodiments, the training engine may be processed on a local processor. This may be used to personalize a system to a particular driver. Alternatively, the training engine may be processed on one or more processors in the cloud. In this example, the device that is configured according to certain aspects of the present disclosure may compute sampled p and a vectors on a local processor and send the computed vectors to the cloud for training. In some embodiments, the "Back-to-the-Future" approach may be applied to data that were collected in a driver monitoring, ADAS, or autonomous driving system, among others.

Additional sensors may be provided as inputs to a learning system in accordance with certain aspects of the present disclosure. Additional sensor inputs may include additional cameras, Lidar, radar, environmental sensors, Map data, other information from external sources (internet, other cars, etc.), and others.

A learning system in accordance with certain aspects of the present disclosure may update the parameters of an AI engine based on prediction errors, which may be a difference between predicted and actual driving behaviors. Such a prediction error may not represent an error by the AI engine in some cases. For example, the driver may exhibit poor driving behavior over the course of the predicted path. In addition, the driver may leave the current 'lane' to follow a certain pre-determined route of travel. In addition, the driver may initiate a discretionary lane change, may stop to take a break from driving, or may take an unplanned detour. In these cases, the actual path of travel may not be a good proxy for the predicted path of travel. If these errors in the prediction error are rare (as they may be expected to be) then the system may learn to ignore them. The system may also proactively decrease the impact of these kinds of errors. Several methods for decreasing these types of errors are contemplated, including: (a) Detect and ignore large errors (i.e. outlier detection). An example would be to ignore errors beyond a certain threshold; (b) Ignore feedback from drivers with a poor driving score over the last T seconds where T is a configurable parameter; (c) Use a pre-programmed GPS route information to modify the predicted path of travel.

Since training may not occur in real-time or near real-time, a system may store all of the actual and predicted paths, or a sample of the actual and predicted paths, and make a determination on which "actuals" to use for calculating the prediction error at a later time. In one example, the criteria for using the "actuals" may include an identification of at least one of the conditions mentioned above, which may flag the data vector for exclusion. Alternatively, the system may modify the predicted path post-hoc to account for the outlier actuals. For instance, once the system detects that a lane change occurred at time t0, the predicted path starting from time t0 could be modified to account for a lane change.

According to certain aspects of the present disclosure, a machine learning system may be trained. Based on a reference state, s, the object's predicted path of travel, p, may be computed, where p is a vector $p(t)$, $p(t+dt)$, $p(t+2dt)$ . . . $(p+(N-1)dt)$. In some embodiments, $p(t)$ may be the controllable vehicle state at time t. In this example, controllable vehicle state may refer to parameters of the vehicle's state that can be controlled by the vehicle. This may include the vehicle's GPS location, speed, lane position, accelerometer, etc., but may exclude parameters such as traffic condition, weather condition, etc., that are outside the control of the object.

Based on the current state of the vehicle, $s(t0)$, a desired path of travel may be computed and used for training purposes as the "actual" path of travel, a, where a is the same vector type as p. Several means for computing a are contemplated. In one embodiment, objects in the actual path of travel may be mapped to the current frame of reference. In another embodiment, crowd sourced data from multiple vehicles who are (or were) in a similar state may be used. Several means for using the crowd sourced data are contemplated. The crowd sourced data may be combined, averaged, and/or clustered to compute a desired path of travel. In this example, the "actual" path of travel may be considered a normal or typical course of action from a given state that is based on previous recordings of moving objects in the same or similar states. A prediction error may be calculated based on the predicted and desired path of travel, and further, may be used to train a learning system. In some cases, there may be multiple predicted paths of travel.

Several methods for improving accuracy of a learning system in accordance with certain aspects of the present disclosure are contemplated. These include, but are not limited to, outlier detection, use of crowd sourced data selected from drivers with a "good" driving score, use of GPS route information, among others.

For a learning system, a "predicted path of travel" may be considered a predicted time sequence. In addition to using certain disclosed methods to train an AI system to predict a path of travel, the disclosed learning methods may be used to train lane detection, and other types of driver behavior including but not limited to: traffic sign compliance, pedestrian interactions, tailgating, and adapting to road and weather conditions.

Several uses for predictions from a trained machine learning algorithm are contemplated. For example, a system may predict what a good human driver would do in a given circumstance. An autonomous car may then, according to certain aspects of the present disclosure, learn to perform driving patterns that are more human-like. An issue with current autonomous vehicles is that they drive in non-human ways. For example, current autonomous vehicles may not exhibit expected "non-verbal" or "gestural" cues of their intended actions. The lack of such human-like driving behavior may result in more rear-end collisions. The "Back-to-the-Future" approach, therefore, may improve "non-verbal" or "gestural" signals of an autonomous vehicle.

In some embodiments, a system in accordance with the present disclosure may constantly or periodically record the path of travel and may then determine an "actual" path of travel based on one or more trainer vehicles that have been in a similar state, s. A "trainer" vehicle may be any vehicle that can serve as a reference for training. Trainer vehicles may include human driven vehicles as well as vehicles that are driven by other means. For example, an autonomous vehicle with a superior driving performance may be used as a trainer vehicle for an autonomous vehicle that may be less expensive, or that may have less driving experience. Any vehicle that is expected to exhibit better driving behavior than the current system may be used as a trainer vehicle. Based on the vehicle's current state (which may include GPS, speed, weather conditions, vehicle type, etc.) the system may determine the "actual" path of travel (which may be a "target" path or a "desired" path) from one or more "trainer" vehicles with a similar state, s.

In some situations, a vehicle may have multiple "correct" paths to choose from. For example, a vehicle may change lanes, or may not change lanes, at a given point in its journey, and either choice may have been an appropriate driving path. When there are multiple "correct" paths of travel, the determination of a "correct" actual path of travel may include selecting from among the available choices. In some cases, the choice of one correct path among several possible correct choices may not impact the key performance indicators of the driving algorithm in, for example, an IDMS or in a machine learning context. In cases with multiple "correct" paths of travel, an AI engine could generate multiple different predicted paths of travel.

In a situation in which there is more than one actual path of travel, the training of an AI engine in accordance with certain aspects of the present disclosure may include selecting one of the predicted paths of travel. For example, the path that is closest to the actual path of travel may be selected according to an objective cost function. A prediction error may be determined between the selected path and the determined actual path. In some embodiments, the prediction error may be used that to improve the performance of the AI engine, which may include the AI engine's path prediction performance.

In an embodiment in which the AI engine is using the actual path of travel of the vehicle, and not using a method that includes crowd sourcing, the AI engine may only have access to the one actual path of travel. That is, the AI engine may only have access to the actual path of travel of the vehicle according to the "Back-to-the-Future" approach described herein. In contrast, in an embodiment in which the AI engine is using crowd-sourcing to predict a path of travel from previously recorded actual paths of travel from multiple vehicles, a system in accordance with the present disclosure may generate a number, K, of desired paths of travel as a function of the current state. In this case, the system may select a subsample of the predicted paths of travel to compare against the K desired paths of travel. The system may then select one path of travel according to an objective cost function. The subsample, K, of desired paths of travel may include all of the paths, M, that were predicted based on a crowd-sourcing method.

While some of the examples presented above relate to vehicles, aspects of the present disclosure may be applied to any AI system for which is may be desirable to predict a future course of action based on current state. In one embodiment, a reference or trainer system may be provided by humans performing the same task. For example, aspects of the present disclosure may be applied to a Robot for which an ability to navigate inside a building may be desirable. Humans equipped with similar sensors as the Robot may serve as the reference "trainer" system. The human's "actual" path of travel may be projected or mapped onto the Robot's current frame of reference. In some embodiments, a learning system may compare the actual path of travel with the Robot's predicted path of travel. This comparison may be used to teach the Robot what to do next. In addition to helping the Robot learn to navigate a building, certain aspects of the present disclosure may be applied to learning other useful behaviors, such as how to avoid obstacles, climb stairs, etc.

Certain aspects of the present disclosure may be applied to an autonomous drone that is learning to fly (navigate, avoid obstacles, do cartwheels, etc.). In this example, the reference, or trainer, system could be a drone operated by a human, for example.

Distant Object Detection

For IDMS, driver monitoring, ADAS, autonomous driving systems, and the like, it may be desirable to detect distant objects that may be encountered while driving, including cars, pedestrians, bicyclists, motorcyclists, and other objects. For heavy commercial vehicles traveling at freeway speeds, drivers may be encouraged to be aware of vehicles out to 12 seconds, or more than 1200 feet. Visual detection of cars and other objects out to these distances for a desirable camera field of view (FOV) may require a high-resolution capture.

Current systems may have some object detection capabilities, but the processing speed and accuracy of these systems often has a tradeoff. For example, processing high-resolution images in detail may provide improved accuracy for identifying objects, particularly for more distant or smaller objects, but for current systems the higher resolution comes with an increased processing cost in terms of additional pixels to process. Accordingly, there is a need for methods to quickly determine object locations at far distances, including objects that may impact a vehicle's path of travel. Certain aspects of the present disclosure are directed to improved methods for detecting objects.

Current object detection methods may include processing an entire image at one scale, or processing an entire image at multiple scales using a spatial pyramid. A Region of Interest (ROI) may be used to select a sub-region of the image. The ROI may be processed at the same set of scales as would be applied to the entire image. Processing of high-resolution images, such as resolutions of 1080P, 4K, or higher resolution may be prohibitive in terms of computational cost. To maintain real-time or near real-time performance, object detection devices may reduce frame rates or may require additional computational units at increased cost in money, power, space, and heat. Object detection at a distance, therefore, may not be feasible for mobile real-time in-device computation with consumer grade parts. In some cases, a tradeoff may be chosen to process images at lower resolution, but such a system may only reliably detect objects such as cars out to a few hundred feet or less.

Certain aspects of the present disclosure are directed to improved methods of object detection that may enable detection of objects such as cars at a greater distance than would be possible by a comparably equipped system that do not include the disclosed methods. In one embodiment, multiple regions of interest (ROI) may be determined in a video frame or sequence, and different ROIs may be processed at different resolutions. In one embodiment, a determined region of interest may be associated with the driving or road environment, and may cut off the regions of the image corresponding to the sky and tops of high rise buildings to reduce the area of computation. The detection algorithm may process the initial ROI at a low resolution, such as 480p, or potentially lower. An appropriate "low resolution" may be higher as technology advances. In this ROI, one or more sub-ROIs may be determined, and the detection algorithm may be run at successively higher resolutions in these sub-ROIs. This method may enable processing the entire frame, but targeting the computationally expensive high resolution processing for small ROIs around the region of interest that are more likely to have distant objects, while processing more of the frame at the less computationally expensive lower resolution, or not at all.

Several methods for determining the sub-ROIs are contemplated. In one embodiment with a single far field ROI, the far field ROI may be determined statically at install or calibration time of a device that is configured according to certain aspects of the present disclosure. The far field ROI may be stored as a set of parameters. In another embodiment, the far field ROI may be relatively static, but determined using on-line calibration such as by determining the vanishing point based on lane markings and creating a rectangular sub-ROI around the vanishing point.

In another embodiment, the one or more far field ROIs may be determined based on the predicted path of travel. In one embodiment, the sub-ROI may be determined as a region around the area where the lanes end or the path of travel ends in the image, so that it adapts to curves in the road; this may allow for a smaller sub-ROI than a static or relatively static ROI. In a more targeted sense, for the purposes of determining following distance, for example, the sub-ROI may be restricted to the lane or a fixed width around the path of travel.

In another embodiment, the sub-ROI may additionally be based on the estimated distance of the sub-ROI. This estimated distance may be based on the measured width of the lane markings, or based on the computed GPS distance from a back-to-the-future path estimate. The resolution used for each sub-ROI may be based on the estimated distance targeting a minimum pixel density such as pixel width or height of objects. For example, a device that embodies certain aspects of the present disclosure may target a minimum of 20 pixels assuming a typical car width of 1.8 m and accounting for the camera FOV in pixels.

Detecting objects at long distances may be difficult, as distant objects may appear small and may occupy a small amount of area in a video frame or in a Lidar or radar scan. Accordingly, an embodiment of the "Back-to-the-Future" approach may be applied to distant object detection. Objects, such as cars or pedestrians, may be detected in a "future" frame when they are closer to an ego-car and in which they may appear larger and may occupy a larger amount of area in a video frame or in a Lidar or radar scan. The object that is detected in the "future" may be then tracked backward in time to an earlier frame. Tracking techniques such as HOG or motion vectors may be used to track the object across frames. In this way, an object may be detected, and may be identified in an earlier frame for which the detection would have been challenging if the "Back-to-the-Future" approach were not available.

As with determining the path of travel, the object detection predictions based on the earlier frames may be combined with the determined object detection from the "Back-to-the-Future" approach, to train learning systems with minimal or no human labeling. In this embodiment, a bounding box and HOG or other tracking features may be determined in the future close-up frame, and tracked backward in time to the earlier frame using the later time frame to label and establish a bounding box on the earlier frame. This may also improve the accuracy of labels on objects that may be hard to distinguish otherwise.

The location of objects may be useful, for example, in determining whether a path of travel will bring a car into close proximity of a detected object. For example, object detection may be a desirable feature that could be used in conjunction with a path predicting and/or path determining system, such as one using a "Back-to-the-Future" approach or a predictive system approach that was trained on "Back-to-the-Future" labeled data in accordance to certain aspects of the present disclosure, or may be used in conjunction with computer vision based lane detection approaches, or other approaches.

Determining Vehicle Interactions

Certain aspects of the present disclosure may be applied to systems that determine driving behaviors in response to objects in the environment. Tailgating, for example, is a driving behavior in which a car drives at an unsafe distance behind the car ahead of it in the same lane. Since a determination of tailgating behavior depends on a determination of the lane occupied by two cars, a method for determining the lane of travel may be desirable for a driver monitoring system. A driving monitoring system with robust lane detection, for example, may be able to properly ignore situations that may appear to be tailgating but in which the car ahead is actually in a different lane. As described above, FIG. 2 illustrates an example of what may appear to be tailgating behavior, but in which the car ahead is actually in an adjacent lane and travelling around a curve.

Given the determined object locations and determined future path of travel, either estimated or measured and projected, it may be desirable to determine interactions between the determined path and the detected objects. Approaches that estimate a path of travel or measure the future path of travel may assume a path width based on either a typical lane width, such as 3.7 m, or based on the measured or estimated typical width of the ego-car. Additionally, the future path may use lane estimation so that when lane markings are present the width and shift of the lane markings may be adaptively matched up to the computed or estimated future path of travel. In this example, when the vehicle travels in areas where the lane tracking algorithm temporary loses track, such as in areas with lighting variations from overpasses, or areas facing toward the sun at sunrise/sunset, or fresh pavement where lane markings have not yet been added, the path of travel alone may determine the lanes. Still, the determined location and width of the lanes may be more accurate due to the recent prior interaction with the lane detection algorithm. In some embodiments, a system may measure the offset from the center lane and the width of a lane. Alternatively, the system may include a tracking algorithm such as a Kalman Filter.

If the measured path of travel is based on GPS, accuracy for a camera may be improved based on radar or Lidar. In this example, a projected GPS path of travel in an IPM reference frame may be overlaid with the radar or Lidar data to determine if detected objects lie in the path of travel, even if they lie on curved roads.

A hybrid system is contemplated in which an inference engine provides a confidence level on a prediction error computed in "real-time" based on current inputs and is compared with a confidence level based on a "Back-to-the-Future" approach in accordance with certain aspects of the present disclosure. The system may choose to use one approach over the other based on the confidence intervals. For a road with clear lane markings in a hilly area, for example, the inference engine may detect the lanes with high confidence, but may have low confidence in projecting the future into the current frame of reference due to poor estimates of GPS, elevation changes, and the like.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more specialized processors for implementing the neural networks, for example, as well as for other processing systems described herein.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method, comprising:
   determining an actual path of travel of a camera from a first time to a second time, wherein the camera is mounted to a vehicle;
   receiving a captured image, wherein the captured image is captured by the camera at the first time;
   generating an overhead view from the captured image; wherein the overhead view is anchored to a position of the camera; and
   mapping the actual path of travel to the overhead view.

2. The method of claim 1, wherein the overhead view is generated using an inverse perspective model.

3. The method of claim 1, wherein the overhead view is a bird's eye view reference frame anchored to the position of the camera.

4. The method of claim 1, wherein the actual path of travel is determined based at least in part on inertial sensor input data.

5. The method of claim 1, wherein mapping the actual path comprises:
   orienting the actual path of travel to align with the overhead view; and
   scaling the actual path of travel based on a scale of the overhead view.

6. The method of claim 1, further comprising:
   detecting an object in the captured image; and
   determining a location, in the captured image, of the object.

7. The method of claim 6, further comprising:
   mapping the location of the object in the captured image to a location of the object in the overhead view.

8. The method of claim 7, further comprising:
   determining a distance between the object and the actual path of travel, based on the location of the object in the overhead view and the actual path of travel in the overhead view.

9. The method of claim 6, further comprising:
   determining a perspective mapping from the overhead view to a camera reference frame, wherein the camera reference frame corresponds to the captured image;
   mapping the actual path of travel from the overhead view to the camera reference frame based on the perspective mapping; and
   determining a distance between the object and the actual path of travel, based on the location of the object in the captured image and the actual path of travel in the camera reference frame.

10. The method of claim 6, further comprising:
    determining that the object and the vehicle are not in the same lane, based at least in part on the actual path of travel.

11. The method of claim 6, wherein the object is a second vehicle.

12. The method of claim 11, wherein the second vehicle is parked.

13. The method of claim 6, wherein the object is a lane boundary.

14. The method of claim 1, further comprising:
    mapping the actual path of travel to a second reference frame.

15. The method of claim 14, wherein the second reference frame is a predicted camera view of the camera at a third time.

16. The method of claim 14, wherein the second reference frame is a camera view of a stationary camera.

17. The method of claim 14, wherein the second reference frame is a satellite image.

18. The method of claim 1, further comprising:
    estimating a lane location based at least in part on the captured image; and
    refining the estimated lane location based on the actual path of travel to produce a refined lane location.

19. The method of claim 18, further comprising:
    training a path prediction model based on the estimated lane location and the refined lane location.

20. The method of claim 19, wherein training the path prediction model is further based on satellite image data for which a person has labeled:
    boundaries of a visible lane;
    an appropriate future driving path of travel; or
    some combination thereof.

21. An apparatus comprising:
    at least one memory unit; and
    at least one processor coupled to the at least one memory unit, in which the at least one processor is configured to:
        determine an actual path of travel of a camera from a first time to a second time;
        receive a captured image, wherein the captured image is captured by the camera at the first time, and wherein the camera is mounted to a vehicle;

generate an overhead view from the captured image;
   wherein the overhead view is anchored to a position of the camera; and
map the actual path of travel to the overhead view.

22. A computer program product, the computer program product comprising:
   a non-transitory computer-readable medium having program code recorded thereon, the program code, when executed by a processor, causes the processor to:
   determine an actual path of travel of a camera from a first time to a second time;
   receive a captured image, wherein the captured image is captured by the camera at the first time, and wherein the camera is mounted to a vehicle;
   generate an overhead view from the captured image;
      wherein the overhead view is anchored to a position of the camera; and
   map the actual path of travel to the overhead view.

* * * * *